United States Patent

[11] 3,628,459

| [72] | Inventor | Johnie N. Lesikar |
| | | Macon, Ga. |
| [21] | Appl. No. | 826,535 |
| [22] | Filed | May 21, 1969 |
| [45] | Patented | Oct. 21, 1971 |
| [73] | Assignee | Maxson Electronics Corporation |
| | | Long Island, N.Y. |

[54] LOCKING DEVICE FOR AIR-DRIVEN BOMB FUSE
5 Claims, 5 Drawing Figs.

[52] U.S. Cl. .................................................. 102/81.2
[51] Int. Cl. .................................................. F42c 15/00
[50] Field of Search ........................................ 102/81,
81.2

[56] References Cited
UNITED STATES PATENTS
2,498,043  2/1950  Lauritsen ...................... 102/81.2

*Primary Examiner*—Samuel Feinberg
*Attorney*—Bernard Malina

ABSTRACT: A locking device for an air-driven assembly for arming a bomb fuse used on multiple bomb racks of supersonic aircraft, whereby y the drive assembly is vane driven and incorporates a locking device which prevents all rotational and axial forces created in the driving vane, as a result of turbulent airflow, from being transmitted to the arming wire.

PATENTED DEC 21 1971 3,628,459

INVENTOR
JOHNIE NALL LESIKAR
BY
Nolte & Nolte
ATTORNEYS

PATENTED DEC 21 1971 3,628,459

INVENTOR
JOHNIE NALL LESIKAR
BY
Nolte & Nolte
ATTORNEYS

LOCKING DEVICE FOR AIR-DRIVEN BOMB FUSE

This invention relates to locking devices for air-driven bomb-arming devices and more particularly to locking devices utilized on arming drive assemblies used on bombs deployed on multiple bomb racks of supersonic aircraft.

In previously known assemblies of this type, the drive assembly was held inoperative and the associated explosive fuse was retained in the safe position by the arming wire which either passed through a rotational member to which the vane was attached or through a hole in the vane.

When assemblies of this type were subjected to high-speed flight conditions, the turbulent airflow created by air passing the adjacent bombs on the multiple bomb racks resulted in vibrational and torsional forces being exerted on the rotating vane member. As the speed of the aircraft increased, this turbulent flow also increased. This oscillational and vibrational force was exerted on the arming wire and caused the arming wire to be sheared allowing premature arming of the bomb fuse.

To prevent this shearing of the arming wire with the resultant problem of premature arming of the bomb fuse it has been necessary, when these previously known assemblies have been utilized, to reduce the operational speed of the aircraft thereby reducing the degree of turbulent flow. This results in increased hazards to the aircraft and pilot, loss of effectiveness, lessening of pilot confidence since the airplane cannot be used to its complete potential and a necessity to jettison unused stores to ensure safe landings.

Accordingly, it is an object of the present invention to provide a bomb fuse arming assembly which can be utilized on externally carried bomb racks of supersonic aircraft.

It is also an object to prevent the shearing of the arming wire by relieving the stress exerted thereon.

It is a further object to incorporate a positive, safe, locking feature which cannot be overridden or damaged in flight at speeds up to Mach 1.2.

It is a further object of the present invention to provide an improved drive assembly whereby an auxiliary locking pin extends through a hole in the vane and absorbs the shear forces which were previously exerted on the arming wire.

It is also an object to provide an improved drive assembly whereby the clearance between the hole in the vane and the locking pin is small so that rotational motion of the vane is prevented. This restriction of vane movement prevents a momentum from being created in the vane which could result in the shearing of the locking pin.

Further objects and advantageous features of the invention will be apparent from the following drawings wherein.

Figure 1:
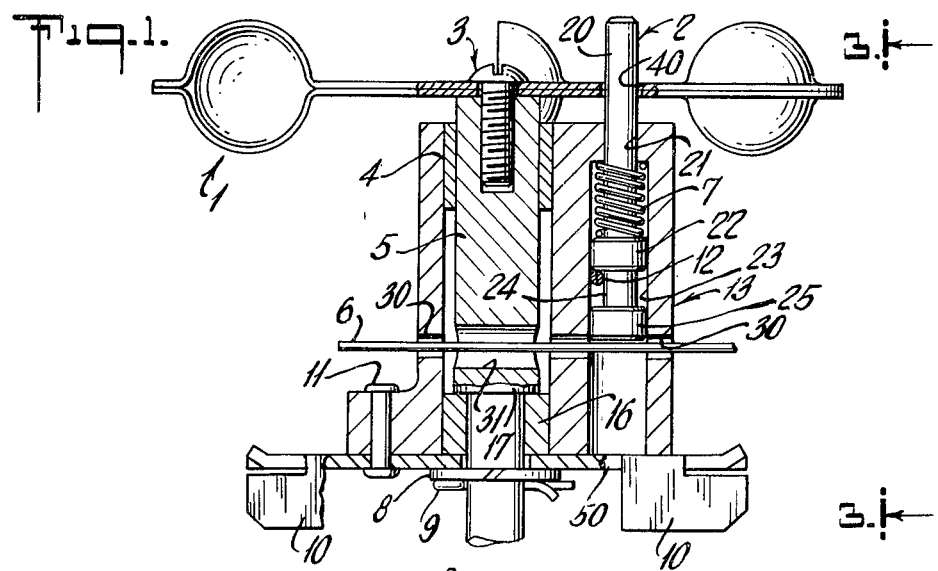
FIG. 1 is a cross-sectional view of a drive assembly according to a first preferred embodiment of the invention, for use on the tail end of a bomb, the drive assembly being in safe condition.
Figure 2:
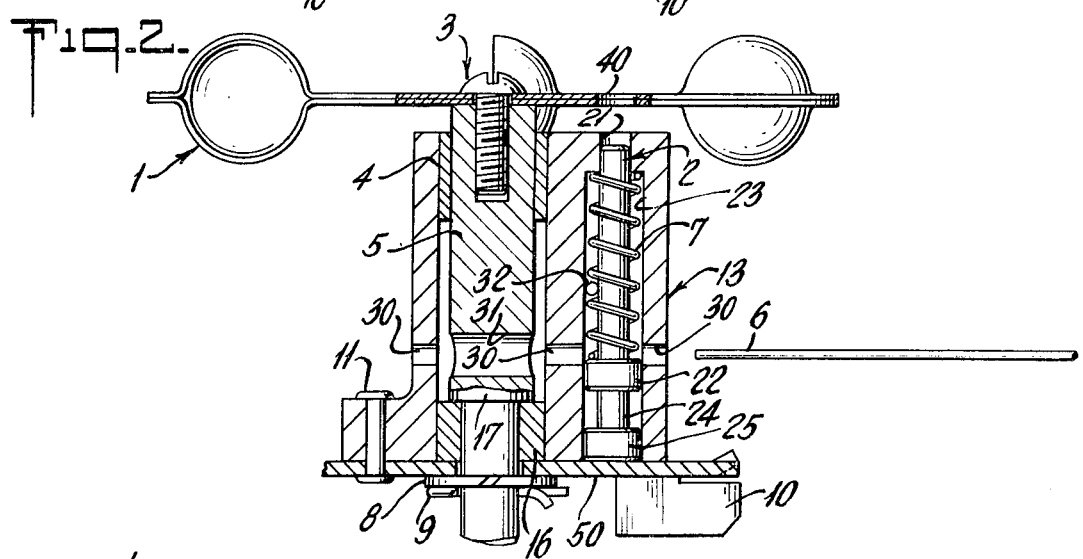
FIG. 2 is a cross-sectional view of the tail drive assembly of FIG. 1 in operable condition.
Figure 3:
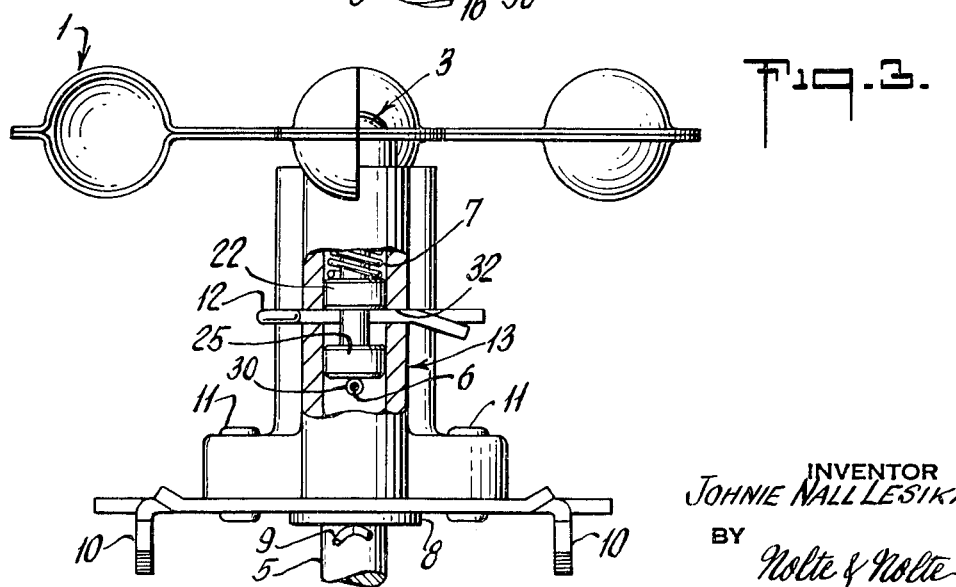
FIG. 3 is a right side view of FIG. 1.

The bomb arming drive assembly as illustrated in FIGS. 1, 2 and 3 is comprised of an anemometer-type vane 1 which is attached to a rotatable shaft 5 by means of a screw 3. This shaft 5 is supported by bearings 4, 16, which are retained in a housing 13. In safe condition (FIG. 1) the rotation of the vane 1 is prevented by a locking pin 2 which extends through a hole 40 in one of the vane arms 41. The locking pin 2 has an elongated cylindrical portion 20 which is adapted to pass through a bore 21 in the housing 13 and parallel to the shaft 5. At one end of the elongated portion 20 there is an axially extending cylindrical enlarged diameter portion 22, and which is adapted to move freely in the housing bore 23 which communicates with and has a common axis with bore 21. The locking pin member 2 has a further axial extension 24 which has a diameter substantially smaller than the diameter of the portion 22. The locking pin 2 terminates in a last axial portion 25 having substantially the same diameter as axial portion 22.

Two bores 30, 32 are established in the housing 13 in a direction substantially perpendicular to the shaft 5 and normal to each other. The first bore 30 is established so as to communicate with bore 23 and bore 31 in shaft 5 and passes completely through the housing 13. The axes of bores 30 and 31 lie in the same plane. Into this bore 30, the arming wire 6 is to be inserted. When inserted the arming wire 6 maintains the locking pin 2 in extended position where it passes through the hole 40 in vane arm 41 whereby the arming drive assembly will be maintained in safe position. The second bore 32 (FIG. 3) passes completely through the assembly 13 and communicates with bore 23 so that when the locking pin 2 is in locking position and a cotter pin 12 is extended through this bore, it will pass between the wall of bore 23 and axial segment 24, between axial segments 22, 25 and will thereby maintain the locking pin 2 in locking or safe position and additionally will maintain the end 25 above bore 30 so that the arming wire can be freely inserted. When the arming wire 6 is inserted, the cotter pin 12 can then be withdrawn. The same results could be achieved by utilizing locking pins having a variety of designs.

The compression spring 7 which is compressedly positioned between the upper end of bore 23 and the upper portion of the enlarged diameter portion 22 will then resiliently urge downwardly the locking pin 2 until it contacts the arming wire 6.

The housing 13 is attached to a base 10 by means of rivets 11. The downward axial movement of the shaft 5 and vane 1 which is mounted thereto by screw 3 is prevented by the shoulder 17 of shaft 5 axially engaging with the thrust bearing 16. Upward movement of the shaft 5 is prevented by the retaining ring 8 maintained in its axial position by cotter pin 9.

To make the bomb fuse, arming, drive assembly inoperative, the locking pin 2 is axially displaced outwardly from the housing 13 by means of a screwdriver or the like which is inserted into base plate bore 50 so as to pass through the hole 40 in vane 1. The cotter pin 12 is then introduced into the cotter pin bore 32 of housing 13. When the arming device is combined with a bomb the arming wire is inserted into the arming wire bore and the cotter pin 12 is removed. When the arming wire 6 is withdrawn the spring member 7 resiliently urges the elongated pin member into the housing. This spring 7 has the strength to overcome the friction which may exist between the locking pin 2 and the vane 1, while the pin is extended therethrough. This movement frees the vane for rotary movement resulting from air passing thereby and this rotary motion arms the bomb fuse.

The strength of the locking pin 2 to counteract the shearing stresses created in the rotational urging of the vane 1 can be varied by varying the distance between the locking pin 2 and the axis of rotation of the vane 1-shaft 5 assembly or by varying the cross-sectional area of the locking pin structure, or by changing the strength of the material comprising the locking pin 2.

Figure 4:
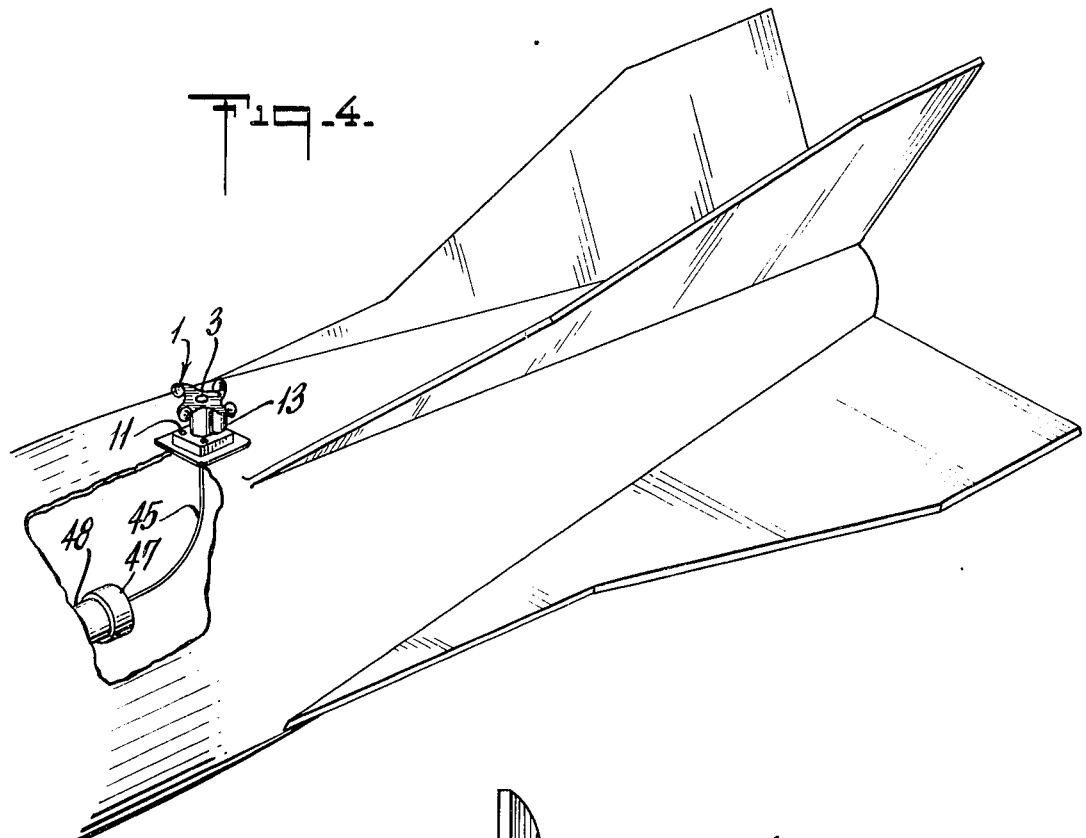
FIG. 4 is a perspective view of tail end drive installation of the drive assembly shown in FIG. 1 on a bomb partly broken away to show its relationship to the bomb fuse.

FIG. 4 illustrates the placement of the drive assembly of FIG. 1 to the tail end of a bomb. The drive assembly is mounted to the side of the bomb by conventional means and the drive shaft 5 is connected to a flexible metal cable 45 which is connected at its other end to the bomb fuse 46 and governor coupler 47.

Figure 5:
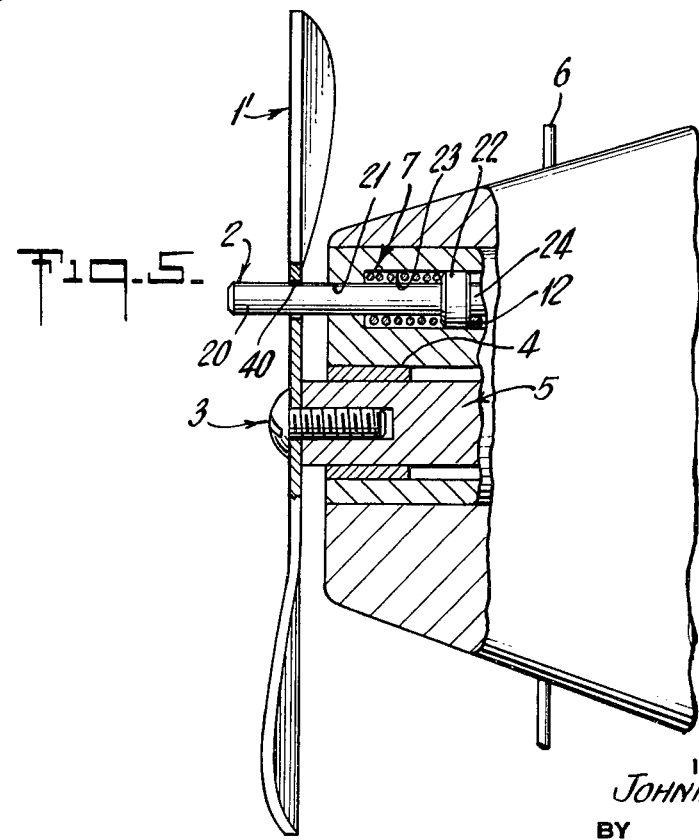
FIG. 5 is a partial cross-sectional view of another embodiment for use at the nose end of a bomb in the safe condition.

FIG. 5 illustrates the second embodiment in position at the nose end of a bomb. As can be seen the rotatable member could then be a propeller 11.

Therefore, it can be seen that while in the prior art structure the arming wire prevented the rotation of the vane structure and thereby was part of the energy system since both the rotational energy and the oscillational energy buildup in the vane were transmitted to this arming wire, in the present invention the arming wire 6 is completely removed from the energy system. As can be seen in FIG. 1 the vane 1 cannot transmit longitudinal forces to the arming wire 15 since shaft bore 31 is substantially larger than bore 30 and longitudinal movement of the shaft cannot result in the shearing of the arming wire. While the vane may exert horizontal forces on the locking pin 2 the locking pin will not transmit these forces to the arming wire since the locking pin and the arming wire are not rigidly attached to each other. Additionally, the oscillational buildup of energy in the rotational vane members is prevented by the restriction of all downward axial motion of the vane 1 by the shaft shoulder 5 and the thrust bearing 16. As a result of this complete removal of the arming wire from the energy system of the drive assembly it can be seen that the only forces which will be directed against the arming wire 15 are those which will be exerted by the spring member 7 which holds the pin 2 in place. When the arming wire 6 and the safety cord assembly 12 are withdrawn from the vane assembly, the spring 7 resiliently urges the pin member downwardly thereby withdrawing the pin from the hole in the vane which therefore results in the vane being free to rotate as a consequence of air passing thereby.

What is claimed is:

1. A drive assembly for use in arming a bomb fuse, comprising a housing having first and second bores, a vane member having a bore therein and freely rotatably mounted to and positioned externally of said housing, whereby the bomb fuse is armed by the rotation of the vane member, an arming wire extending into said housing, means for maintaining said vane in a fixed rotational position and for preventing the transmission of forces exerted by said vane to said arming wire when said vane is in said fixed rotational position, comprising an elongated member axially displaceable in said first housing bore, said first elongated member operative to be displaced outwardly from said housing through said member operative to be displaced outwardly from said housing through said vane bore, said drive assembly further including a second elongated member axially displaceable in said second housing bore, said second housing bore extending into said housing in a direction substantially perpendicular to and communicating with said first housing bore, said second elongated member comprising means for maintaining said first elongated member in said extended position, said drive assembly additionally comprising a freely rotatable housing shaft, said vane member being fixedly mounted to said shaft, said shaft having an axis extending in a direction parallel to the axis of said first elongated member, said shaft having a bore extending radially therethrough, the axes of said radial bore and said second housing bore being in substantially the same plane, said radial bore having a substantially greater diameter than said second housing bore diameter.

2. A drive assembly according to claim 1, further comprising means for substantially preventing the axial displacement of said rotatable shaft.

3. A drive assembly according to claim 2, further including a spring member, the displacement of said first elongated member outwardly from said housing through said vane bore member comprises means for compressing said spring member whereby when said second elongated member is axially displaced out of communication with said first elongated member bore said spring will comprise means for withdrawing said first elongated member from said vane hole.

4. A drive assembly as defined in claim 3, further comprising a third elongated member displaceable in a third housing bore, said third bore extending into said housing in a direction substantially perpendicular to and communicating with said first housing bore, said third elongated member comprising further means for maintaining said first elongated member extended through said vane bore.

5. A drive assembly as defined in claim 4, wherein said second elongated member is said arming wire having a uniform diameter.

* * * * *